(12) United States Patent
Faruque et al.

(10) Patent No.: US 12,109,919 B2
(45) Date of Patent: Oct. 8, 2024

(54) ROTATION ASSEMBLY FOR A SEATING ASSEMBLY

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 408 days.

(21) Appl. No.: 17/746,209

(22) Filed: May 17, 2022

(65) Prior Publication Data

US 2023/0373361 A1 Nov. 23, 2023

(51) Int. Cl.
*B60N 2/22* (2006.01)
*B60N 2/20* (2006.01)

(52) U.S. Cl.
CPC ........ *B60N 2/22* (2013.01); *B60N 2/20* (2013.01)

(58) Field of Classification Search
None
See application file for complete search history.

(56) References Cited

U.S. PATENT DOCUMENTS

| | | | |
|---|---|---|---|
| 4,688,662 A | 8/1987 | Correll | |
| 7,537,283 B2 | 5/2009 | Niitsuma et al. | |
| 8,136,863 B2 | 3/2012 | De Rico Herrero | |
| 8,647,544 B2 | 2/2014 | Burch | |
| 10,266,081 B2 | 4/2019 | Baccouche et al. | |
| 2005/0015929 A1* | 1/2005 | Aufrere | B60N 2/2227 16/337 |
| 2010/0117409 A1* | 5/2010 | Igarashi | F16F 9/145 297/216.12 |
| 2024/0017649 A1* | 1/2024 | Jaradi | B60N 2/2809 |

* cited by examiner

*Primary Examiner* — David E Allred
(74) *Attorney, Agent, or Firm* — Vichit Chea; Price Heneveld LLP

(57) ABSTRACT

A seating assembly includes a rotation assembly. The rotation assembly includes a first portion, a second portion, and an arm portion. The first portion includes an inner wall, an outer wall, and a floor extending between the inner wall and the outer wall. The second portion is movable relative to the first portion. The arm portion includes a first end, a second end, and a tab. The first end of the arm portion is rotatably coupled to a circumferential surface of the second portion. The arm portion is movable between an engaged state and a disengaged state relative to a hole defined by a leg of the first portion and an opening defined by the second portion.

19 Claims, 7 Drawing Sheets

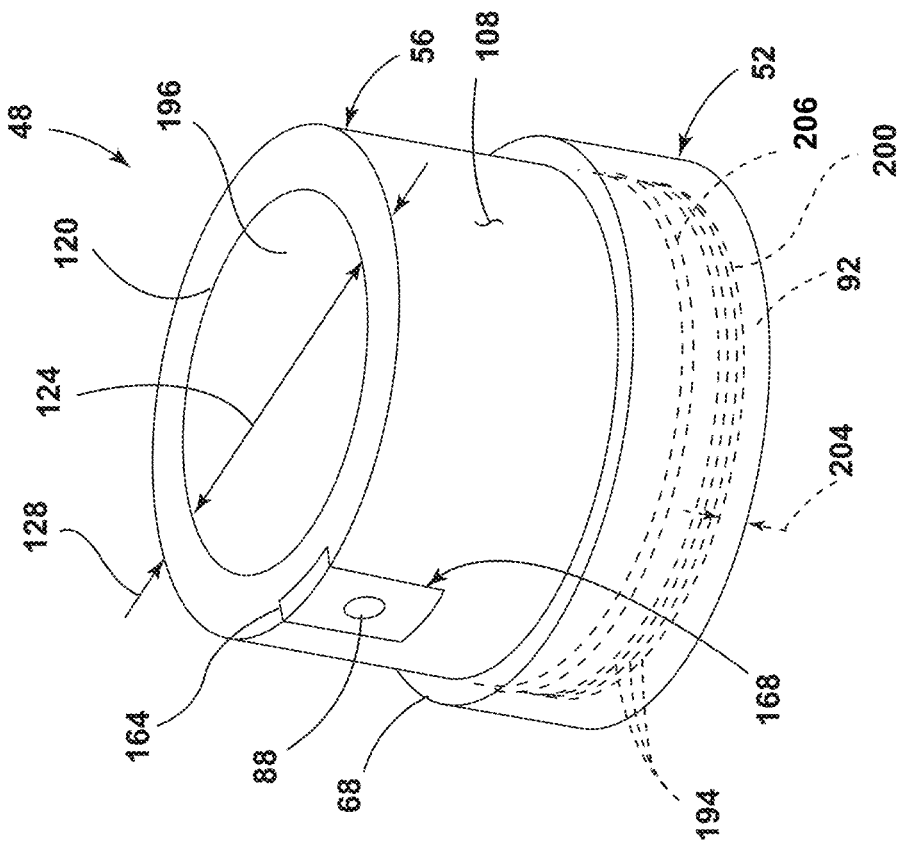
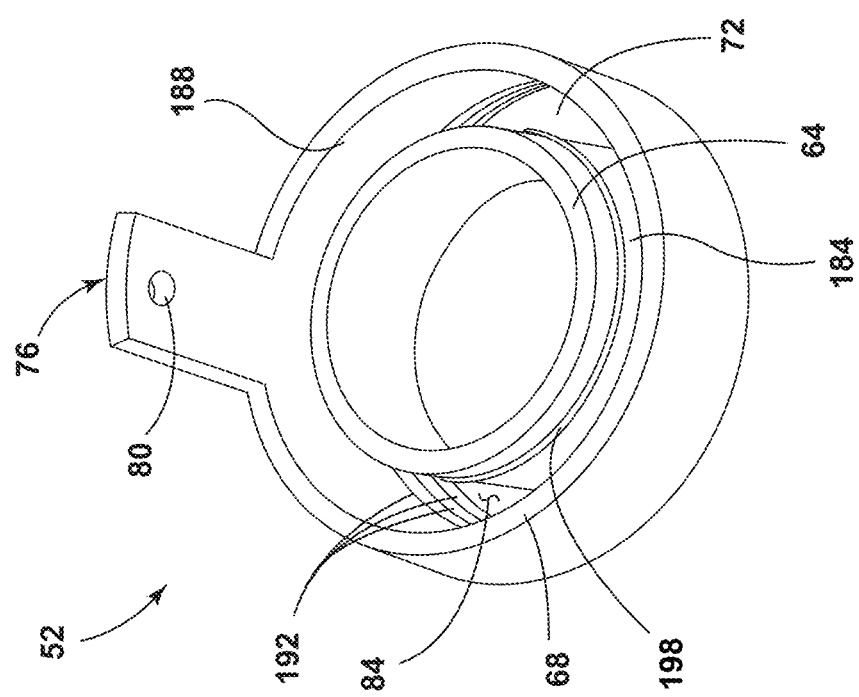
FIG. 6
FIG. 5

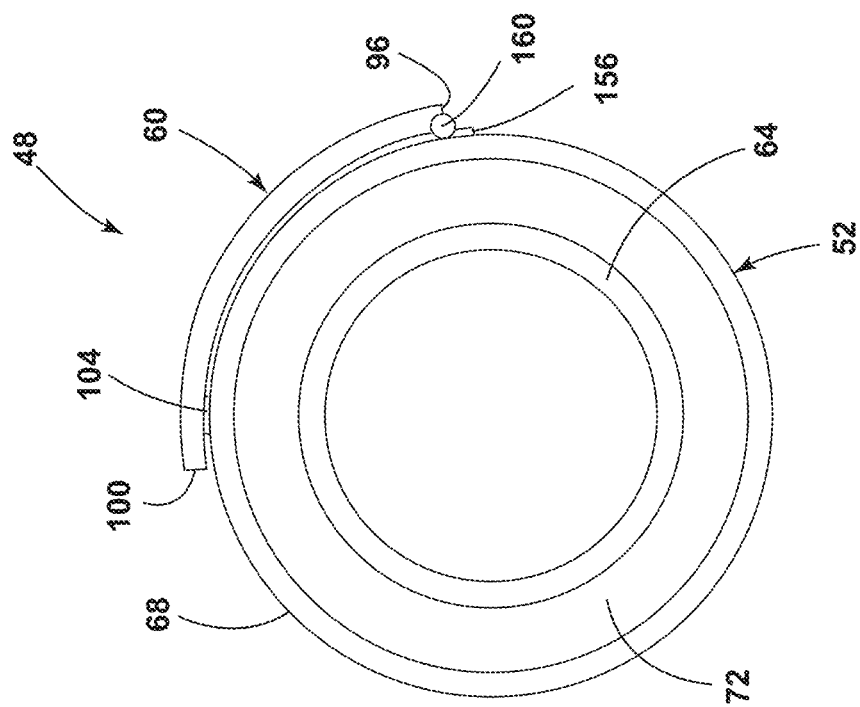
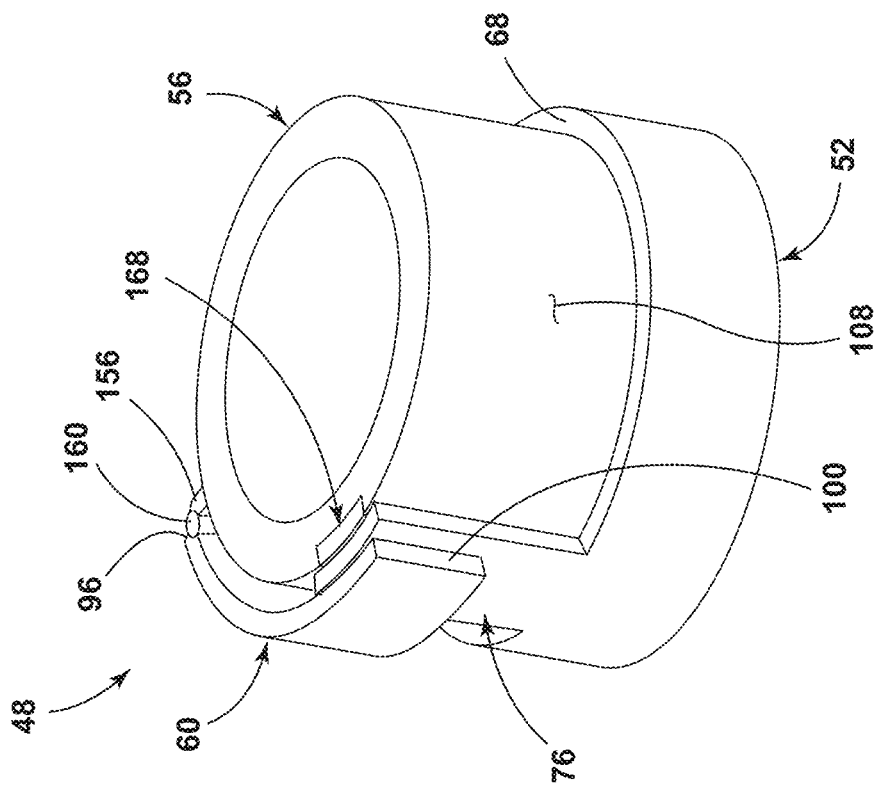
FIG. 7
FIG. 8

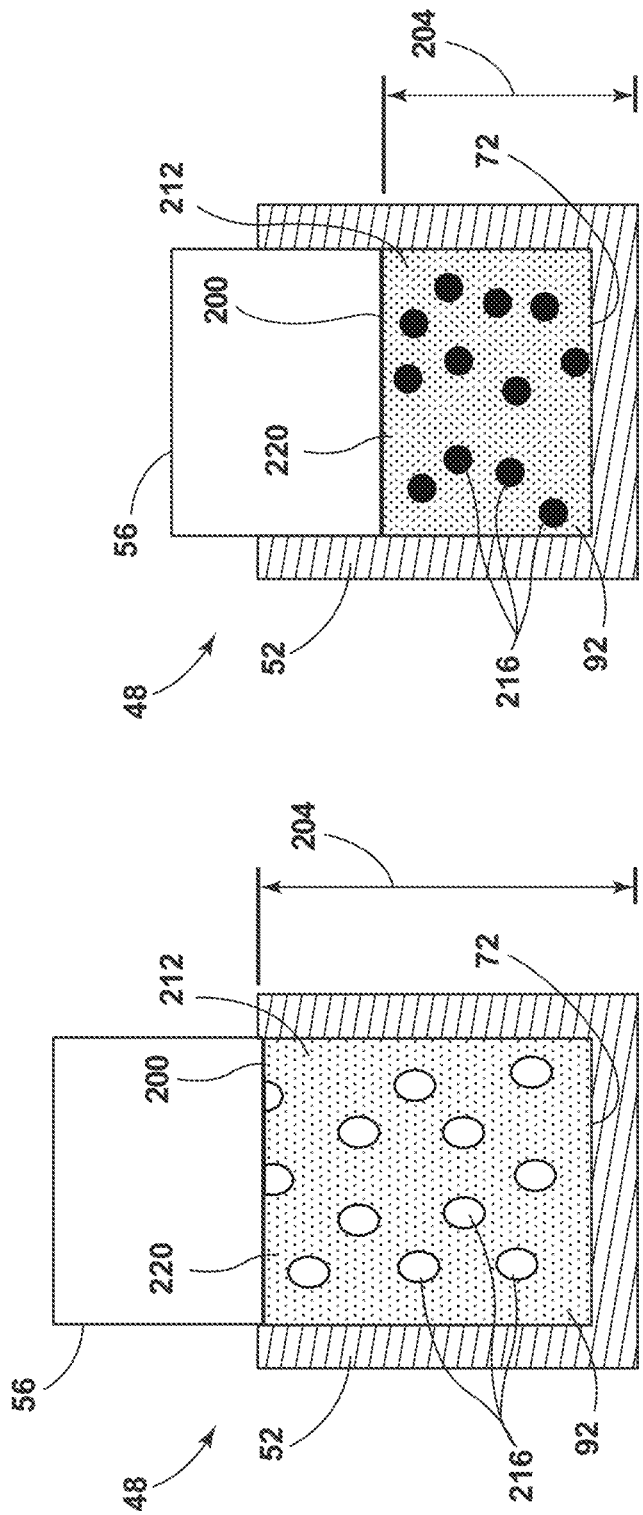

ROTATION ASSEMBLY FOR A SEATING ASSEMBLY

FIELD OF THE DISCLOSURE

The present disclosure generally relates to a rotation assembly. More specifically, the present disclosure relates to a rotation assembly for a seating assembly.

BACKGROUND OF THE DISCLOSURE

Seating assemblies are often provided with a variety of functions. Providing additional functionality to the seating assemblies can increase a customer base for manufacturers.

SUMMARY OF THE DISCLOSURE

According to a first aspect of the present disclosure, a seating assembly includes a rotation assembly. The rotation assembly includes a first portion, a second portion, and an arm portion. The first portion includes an inner wall, an outer wall, and a floor. The floor extends between the inner wall and the outer wall. The outer wall includes a leg that extends away from the floor of the first portion. The leg defines a hole. The inner wall, the outer wall, and the floor define a channel. The second portion is received within the channel of the first portion to define a chamber. The second portion is movable relative to the first portion. The arm portion includes a first end, a second end, and a tab. The first end of the arm portion is rotatably coupled to a circumferential surface of the second portion. The tab is positioned proximate to the second end of the arm portion. The arm portion is movable between an engaged state and a disengaged state relative to the hole defined by the leg of the first portion. The tab is received within the hole defined by the leg when the arm portion is in the engaged state.

Embodiments of the first aspect of the disclosure can include any one or a combination of the following features:
- when the arm portion is in the engaged state, movement of the second portion of the rotation assembly relative to the first portion of the rotation assembly is prevented;
- the seating assembly includes a seat and a seatback, wherein the seatback is pivotable relative to the seat;
- when the arm portion is in the disengaged state, rotation of the seatback away from the seat decreases a volume of the chamber defined by the first portion and the second portion;
- the chamber is filled with a fluid composition;
- the fluid composition resists compression when the volume of the chamber is decreased;
- the fluid composition includes a liquid and particles;
- the fluid composition is a liquid nanofoam;
- a coupling member that couples the seatback to the seat, wherein the seatback is pivotable relative to the coupling member, and wherein the coupling member defines a space;
- a recliner member that is received in the space defined by the coupling member, wherein the recliner member is rotatable relative to the seat and the coupling member;
- a locking member that is configured for selective engagement with the recliner member, wherein engagement between the locking member and the recliner member retains the recliner member in a given position relative to the coupling member;
- the first portion of the rotation assembly is fixedly coupled to the recliner member;
- the second portion of the rotation assembly is fixedly coupled to the seatback;
- the arm portion is transitioned from the engaged state to the disengaged state by exertion of an external force on the seating assembly, wherein the external force is of a predetermined magnitude and a predetermined direction; and
- the second portion defines an aperture that extends therethrough such that the second portion has an inner diameter and an outer diameter.

According to a second aspect of the present disclosure, a seating assembly includes a seat, a seatback, a coupling member, a recliner member, a locking member, and a rotation assembly. The seatback is pivotable relative to the seat. The coupling member couples the seatback to the seat. The seatback is pivotable relative to the coupling member. The coupling member defines a space. The recliner member is received in the space defined by the coupling member. The recliner member is rotatable relative to the seat and the coupling member. The locking member is configured for selective engagement with the recliner member. Engagement between the locking member and the recliner member retains the recliner member in a given position relative to the coupling member. The rotation assembly includes a first portion, a second portion, and an arm portion. The first portion includes an inner wall, an outer wall, and a floor. The floor extends between the inner wall and the outer wall. The outer wall includes a leg that extends away from the floor of the first portion. The leg defines a hole. The inner wall, the outer wall, and the floor define a channel. The second portion defines an opening. The second portion is received within the channel of the first portion to define a chamber. The second portion is movable relative to the first portion. The arm portion includes a first end, a second end, and a tab. The first end is rotatably coupled to a circumferential surface of the second portion. The tab is positioned proximate to the second end. The arm portion is movable between an engaged state and a disengaged state relative to the hole defined by the leg of the first portion and the opening defined by the second portion. The hole defined by the leg and the opening defined by the second portion align when the arm portion is in the engaged state. When the arm portion is in the engaged state, movement of the second portion relative to the first portion is prevented. When the arm portion is in the disengaged state, rotation of the seatback away from the seat decreases a volume of the chamber defined by the first portion and the second portion. The tab is received within the hole defined by the leg and the opening defined by the second portion when the arm portion is in the engaged state.

Embodiments of the second aspect of the present disclosure can include any one or a combination of the following features:
- the first portion of the rotation assembly is fixedly coupled to the recliner member, wherein the second portion of the rotation assembly is fixedly coupled to the seatback;
- the arm portion is transitioned from the engaged state to the disengaged state by exertion of an external force on the seating assembly, wherein the external force is of a predetermined magnitude and a predetermined direction;
- the second portion defines an aperture that extends therethrough such that the second portion has an inner diameter and an outer diameter; and
- the chamber is filled with a fluid composition, wherein the fluid composition resists compression when the volume of the chamber is decreased, and wherein the fluid composition is a liquid nanofoam.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a top perspective view of a first portion of the rotation assembly, illustrating various components thereof, according to one example;

FIG. 6 is a side perspective view of an engagement between the first portion and a second portion of the rotation assembly, according to one example;

FIG. 7 is a side perspective view of the engagement between the first portion, the second portion, and the arm portion when the arm portion is in the engaged state, according to one example;

FIG. 8 is a bottom view of the rotation assembly, illustrating various components thereof, according to one example;

FIG. 9 is schematic representation of a fluid composition provided within a chamber of the rotation assembly, with the second portion in an extended position relative to the first portion, according to one example; and FIG. 10 is schematic representation of the fluid composition provided within the chamber of the rotation assembly, with the second portion in a compressed position relative to the first portion, according to one example.

DETAILED DESCRIPTION OF THE PREFERRED EMBODIMENTS

Figure 1:
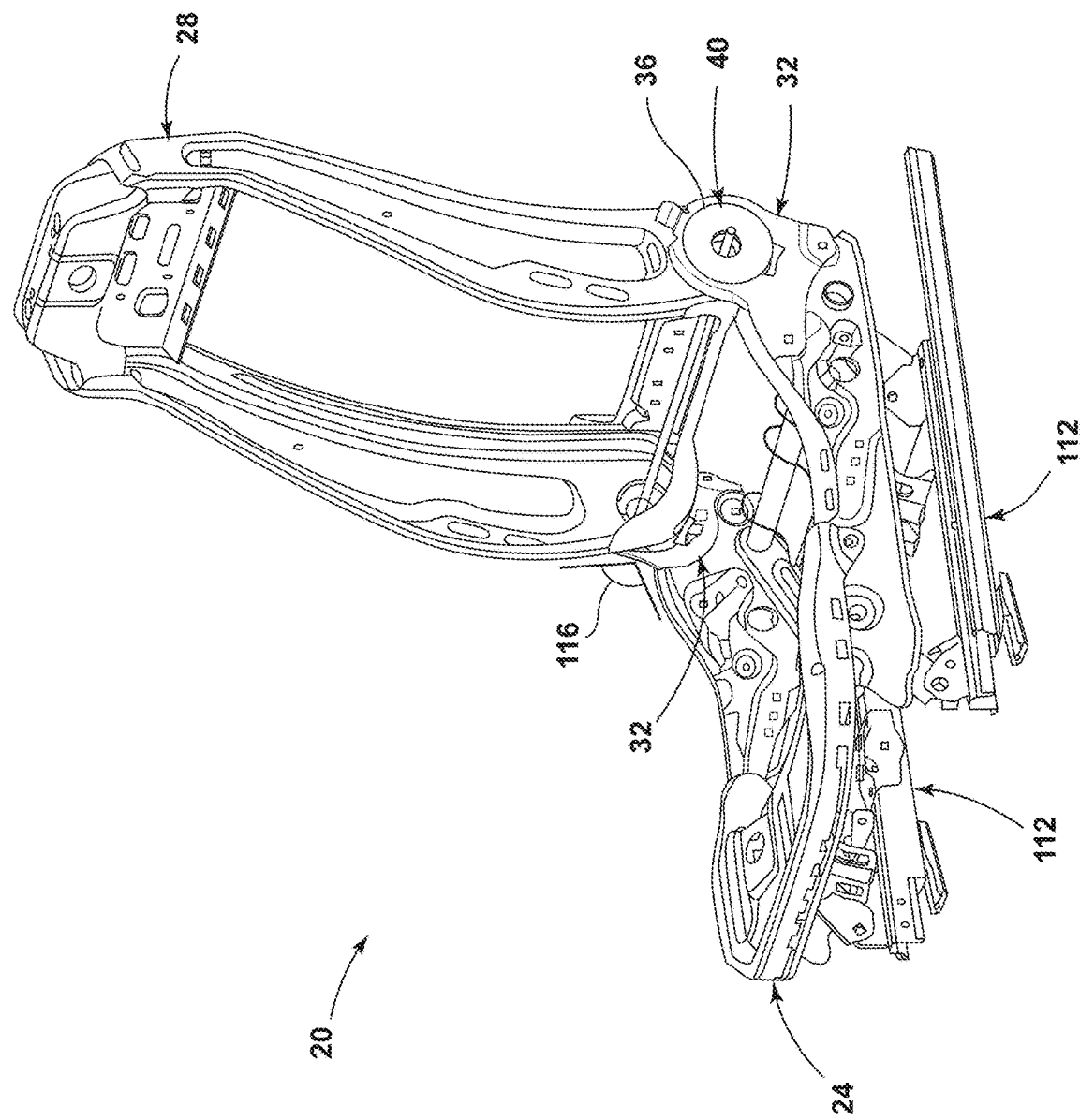
FIG. 1 is a side perspective view of a seating assembly, illustrating various components thereof, according to one example.

For purposes of description herein, the terms "upper," "lower," "right," "left," "rear," "front," "vertical," "horizontal," and derivatives thereof shall relate to the concepts as oriented in FIG. 1 or FIG. 6. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rotation assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 20 generally designates a seating assembly. The seating assembly 20 includes a seat 24 and a seatback 28. The seatback 28 is pivotable relative to the seat 24. The seating assembly 20 may include a coupling member 32 that couples the seatback 28 to the seat 24. In such an example, the seatback 28 is pivotable relative to the coupling member 32. The coupling member 32 can define a space 36. A recliner member 40 can be received in the space 36 defined by the coupling member 32. The recliner member 40 is rotatable relative to the seat 24 and the coupling member 32. The seating assembly 20 may be provided with a locking member 44 that is configured for selective engagement with the recliner member 40. Engagement between the locking member 44 and the recliner member 40 can retain the recliner member 40 in a given position relative to the coupling member 32. For example, the locking member 44 can retain the recliner member 40 in a given position such that an angular relationship (e.g., recline angle) of the seatback 28 relative to the seat 24 may be maintained for an occupant of the seating assembly 20.

Referring again to FIGS. 1-8, the seating assembly 20 also includes a rotation assembly 48. The rotation assembly 48 includes a first portion 52, a second portion 56, and an arm portion 60. The first portion 52 includes an inner wall 64, an outer wall 68, and a floor 72. The floor 72 extends between the inner wall 64 and the outer wall 68. The outer wall 68 includes a leg 76 that extends from a top surface of the outer wall 68 and away from the floor 72 of the first portion 52. The leg 76 defines a hole 80. The inner wall 64, the outer wall 68, and the floor 72 define a channel 84 of the first portion 52. The second portion 56 defines an opening 88. The second portion 56 is received within the channel 84 of the first portion 52 to define a chamber 92. The second portion 56 is movable relative to the first portion 52.

Referring further to FIGS. 1-8, the arm portion 60 includes a first end 96, a second end 100, and a tab 104. The first end 96 is rotatably coupled to a circumferential surface 108 of the second portion 56. The tab 104 is positioned proximate to the second end 100. For example, the tab 104 can be positioned within ten millimeters of the second end 100. The arm portion 60 is movable between an engaged state (FIGS. 3, 7, and 8) and a disengaged state (FIG. 4) relative to the hole 80 defined by the leg 76 of the first portion 52 and/or the opening 88 defined by the second portion 56. The hole 80 defined by the leg 76 and the opening 88 defined by the second portion 56 align when the arm portion 60 is in the engaged state. When the arm portion 60 is in the engaged state, movement of the second portion 56 relative to the first portion 52 is prevented. When the arm portion 60 is in the disengaged state, rotation of the seatback 28 away from the seat 24 decreases a volume of the chamber 92 defined by the first portion 52 and the second portion 56. The tab 104 is received within the hole 80 defined by the leg 76 and/or the opening 88 defined by the second portion 56 when the arm portion 60 is in the engaged state.

Referring still further to FIGS. 1-8, the seating assembly 20 can be employed in a vehicle. For example, the vehicle may be a motor vehicle. In various examples, the vehicle may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle may be a motor vehicle, the present disclosure is not limited to internal combustion engines as a source of locomotive power for the vehicle. Rather, alternative sources may be utilized in providing locomotive power to the vehicle. For example, locomotive power may be provided to the vehicle by electric motors, fuel cells, and/or petroleum-based fuel engines. According to various examples, the vehicle may be driver-controlled, semi-autonomous, fully-autonomous, or any combination of user-controlled and automated. For example, the semi-autonomous example of the vehicle may perform many or all-commuting functions (e.g., accelerating, braking, turning, signaling, etc.) independent of user interaction while the user maintains override control of the vehicle.

With specific reference to FIG. 1, the seating assembly 20 can engage with one or more track assemblies 112. In such an example, the seating assembly 20 may be slidably coupled with the one or more track assemblies 112 such that a position of the seating assembly 20 along the one or more track assemblies 112 may be adjusted (e.g., in a fore-aft direction of the vehicle or side-to-side direction of the vehicle). The seatback 28 is rotatable, or pivotable, relative to the seat 24 and the coupling member 32 such that an angle 116 between the seat 24 and the seatback 28 can be adjusted. For example, the seatback 28 may be rotatable between a forward-dumped position, where the seatback 28 is substantially parallel with the seat 24, and a rearwardly-reclined position, where the angle 116 between the seat 24 and the seatback 28 is obtuse. An occupant-receiving position of the seatback 28 may be an intermediate position between the forward-dumped position and the rearwardly-reclined position, with the occupant-receiving position of the seatback 28 being an intended use position of the seating assembly 20.

Figure 2:
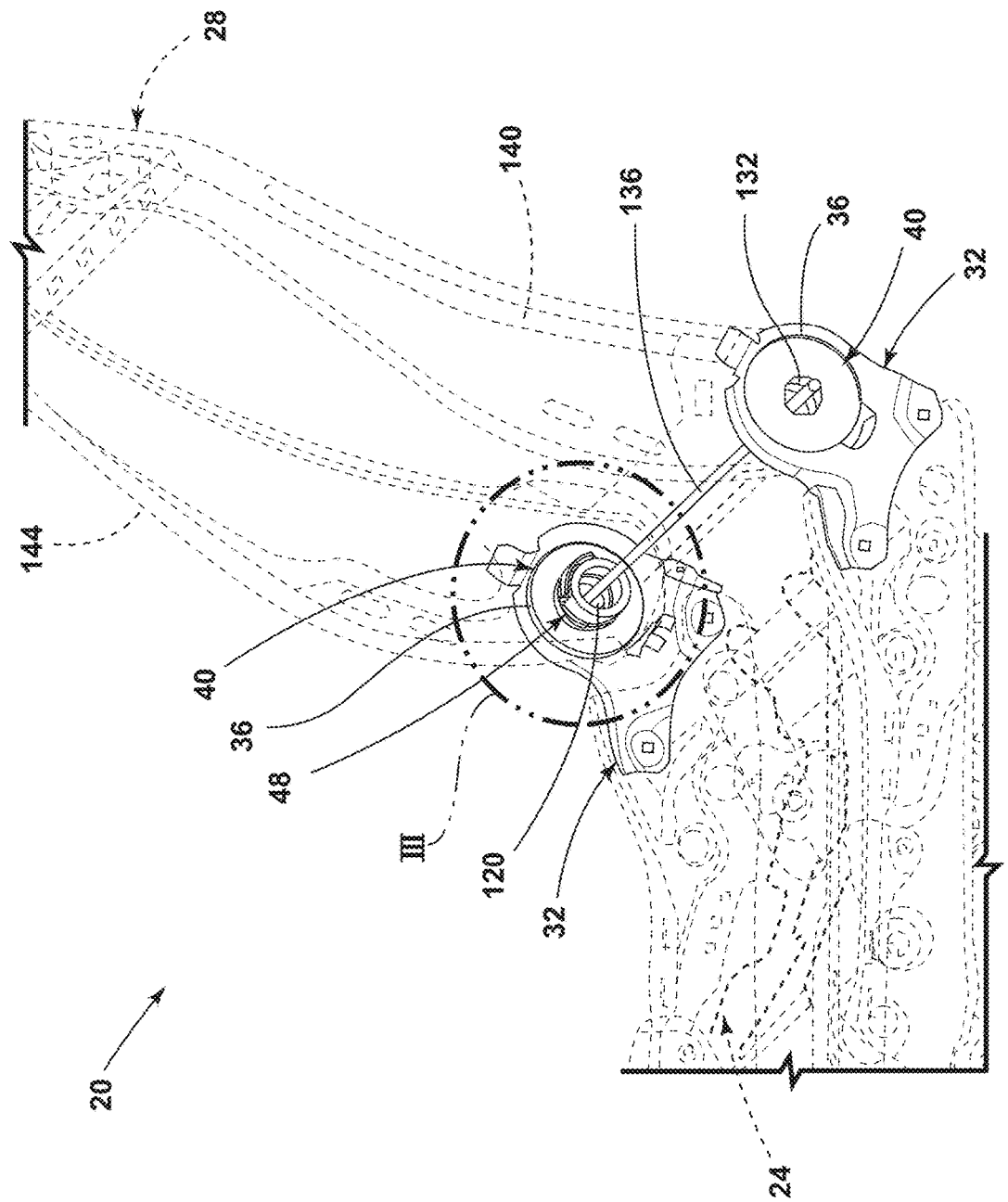
FIG. 2 is a side perspective view of a coupling between a seat and a seatback of the seating assembly, according to one example.
Figure 3:
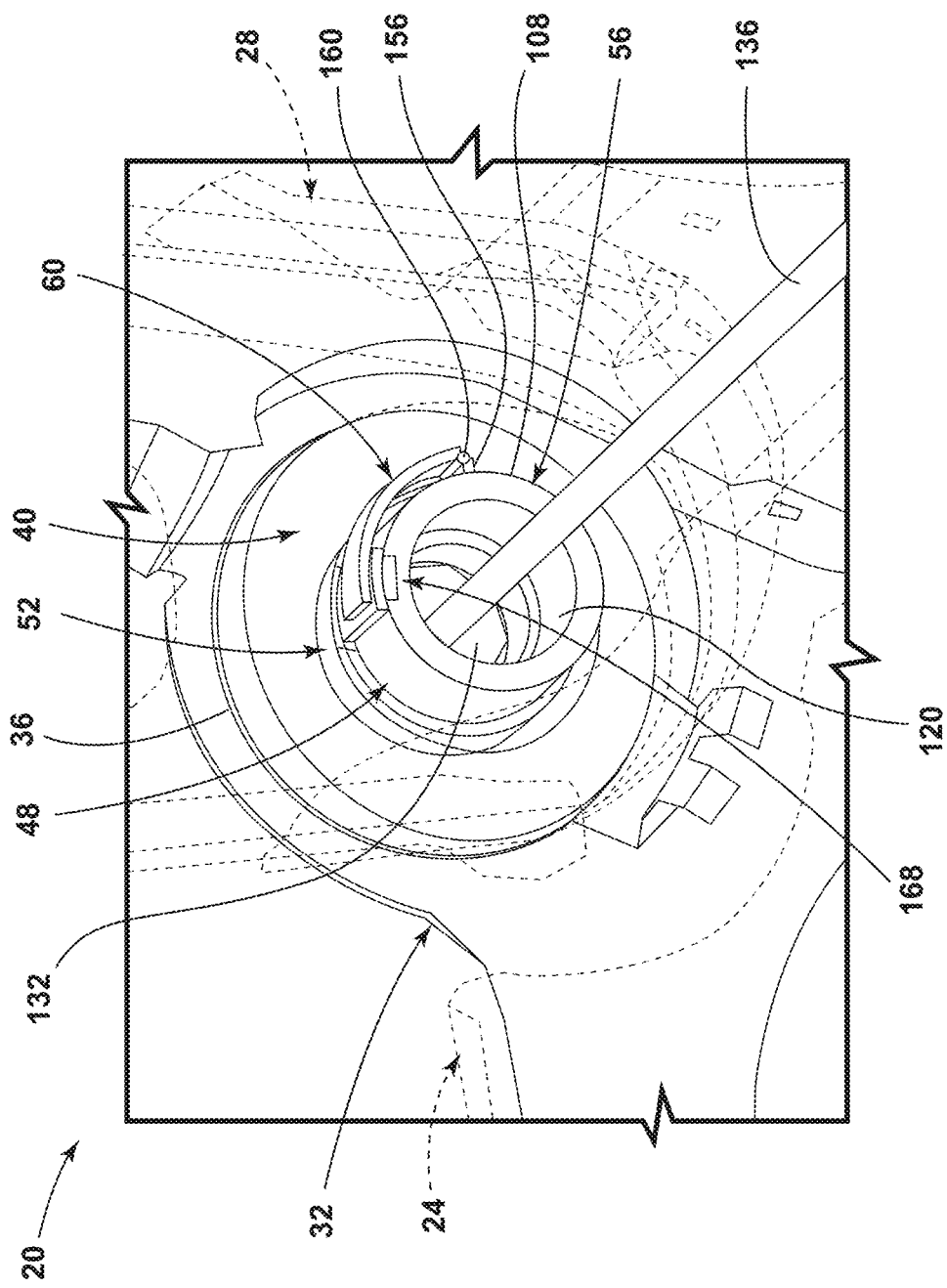
FIG. 3 is an expanded view of the coupling between the seat and the seatback of the seating assembly, taken at region III-III of FIG. 2, illustrating an arm portion of a rotation assembly of the seating assembly in an engaged state, according to one example.
Figure 4:
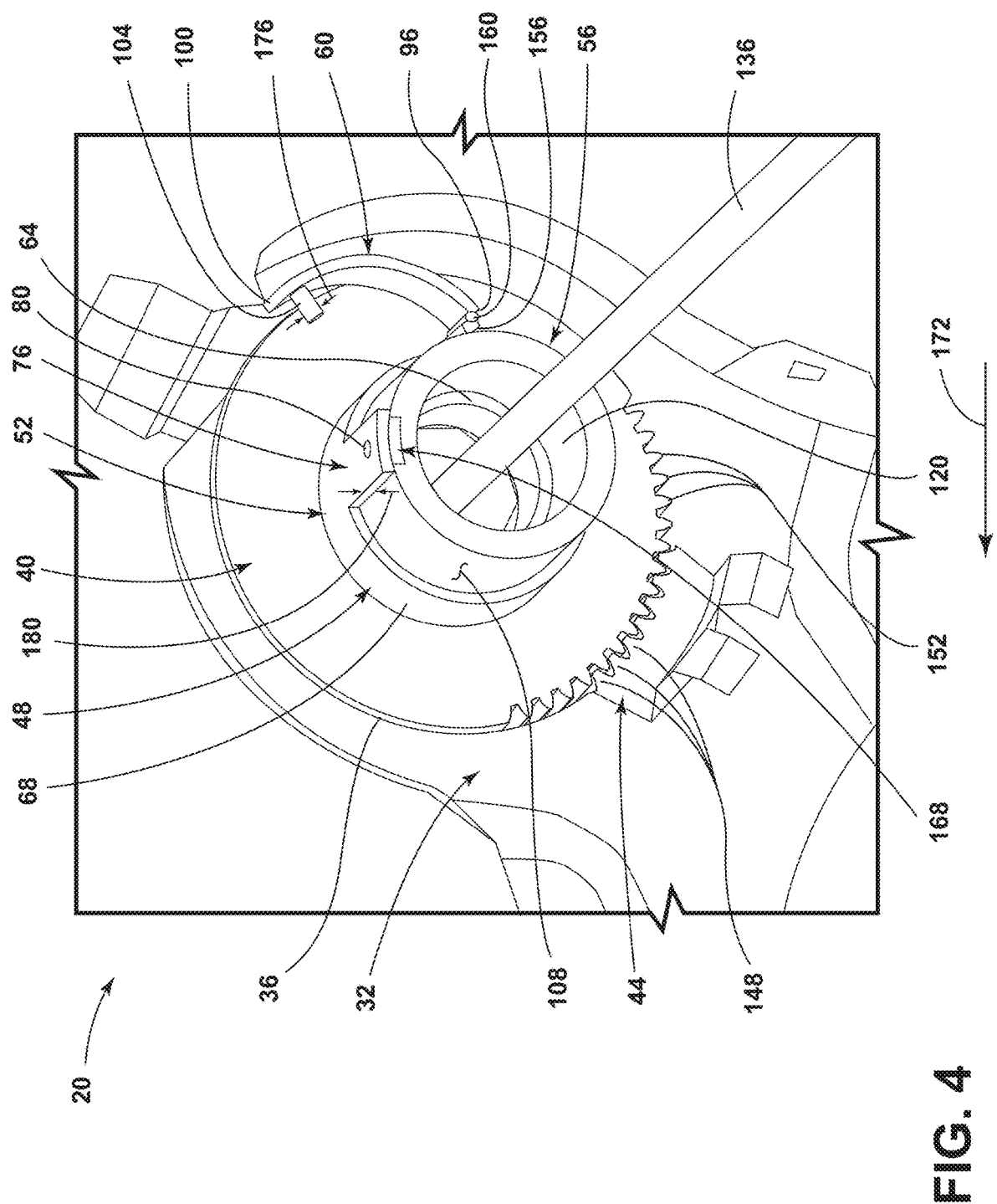
FIG. 4 is a side perspective view of the coupling between the seat and the seatback of the seating assembly, illustrating the arm portion of the rotation assembly in a disengaged state, according to one example.

Referring now to FIGS. 2-4, the first portion 52 of the rotation assembly 48 can be directly coupled to the recliner member 40. Similarly, the second portion 56 can be directly coupled to the seatback 28. In some examples, the first portion 52 can be fixedly coupled to the recliner member 40 and/or the second portion 56 can be fixedly coupled to the seatback 28. The second portion 56 defines an aperture 120 that extends therethrough such that the second portion 56 has an inner diameter 124 and an outer diameter 128 (see FIG. 6). The aperture 120 can align with a void 132 that is defined by the recliner member 40. The aperture 120 and/or the void 132 may receive a rod 136. The rod 136 can extend from a first side 140 of the seatback 28 to a second side 144 of the seatback 28. The rod 136 may be provided with a biasing force (e.g., by a clock spring) that biases the seatback 28 to a position that is between the forward-dumped position and the occupant-receiving position. For example, the structure that provides the biasing force to the rod 136 may be coupled to the coupling member 32 on the first side 140 of the seatback 28. In such an example, the coupling to the coupling member 32 can be a fixed coupling and may provide a surface to bear against. Additionally, or alternatively, the structure that provides the biasing force to the rod 136 may be coupled to the coupling member 32 on the second side 144 of the seatback 28.

Referring again to FIGS. 2-4, in various examples, the locking member 44 may engage with the recliner member 40 in a manner that retains the recliner member 40, and ultimately the seatback 28, in a given position. In such an example, the locking member 44 may prevent the biasing force provided to the rod 136 from causing the seatback 28 to exit a current, or desired, position. In some examples, the locking member 44 may be provided with teeth 148 that engage with teeth 152 that are defined on a circumferential surface of the recliner member 40. In various examples, the teeth 152 on the recliner member 40 may be provided on a portion of the circumference of the recliner member 40. In such an example, the extent to which the teeth 152 are provided on the recliner member 40 and/or the positioning of the teeth 152 on the recliner member 40 may be chosen such that a range of rotational motion of the seatback 28 relative to the seat 24 and/or the coupling member 32 is limited (e.g., limited to between the forward-dumped position and the rearwardly-reclined position).

Referring now to FIGS. 3-8, the arm portion 60 may be directly coupled to the circumferential surface 108 of the second portion 56. Alternatively, the arm portion 60 may be coupled to the circumferential surface 108 of the second portion 56 by a support member 156. In such an example, the support member 156 extends radially outward from the circumferential surface 108 of the second portion 56. The arm portion 60 may be coupled to the support member 156 by a hinge member 160. In various examples, the hinge member 160 may be a pin that is received by a portion of the support member 156 and/or the arm portion 60, where the hinge member 160 retains the arm portion 60 in a coupled relationship with the support member 156. For example, the first end 96 of the arm portion 60 and a free end of the support member 156 may each define hinge apertures that are configured to receive the hinge member 160. In such an example, the hinge apertures defined by the support member 156 and the hinge apertures defined by the arm portion 60 may be configured to be received by one another to assume an abutting relationship or an adjacent relationship. In some examples, the arm portion 60, the tab 104, the support member 156, and the hinge member 160 may be integrally, or unitarily, formed with one another such that the hinge member 160 is a living hinge. In examples where the arm portion 60 is directly coupled to the circumferential surface 108 of the second portion 56, such coupling may provide a living hinge at the first end 96 of the arm portion 60.

Referring again to FIGS. 3-8, in some examples, the second portion 56 may define a recess 164 in the circumferential surface 108 thereof. In such an example, the recess 164 may receive an insert 168. The insert 168 may define the opening 88 of the second portion 56. The insert 168 may be readily replaced in the event of damage to the insert 168. For example, it is contemplated that the opening 88, which can be defined by the insert 168, may be damaged when the tab 104 is induced to exit the opening 88. In such an instance, the insert 168 may be replaced to restore an intended functionality of the rotation assembly 48. In various examples, the opening 88 may be omitted from the second portion 56 such that the tab 104 engages with the hole 80 defined by the leg 76, but does not pass through the circumferential surface 108 of the second portion 56. In such an example, the tab 104 may contact the circumferential surface 108 of the second portion 56. It is contemplated that the insert 168 may be made of a variety of materials. Accordingly, during assembly, the insert 168 may be chosen to acquire a specific operation of the rotation assembly 48. For example, one of the inserts 168 may be chosen based on material properties of the insert 168 and/or one of the inserts 168 may be chosen based upon a size or shape of the opening 88 that is defined by the insert 168. It is also contemplated that a size and/or a shape of the opening 88 defined by the insert 168 may be chosen to provide a particular degree of retention of the tab 104 of the arm portion 60 and/or a particular operation of the movement of the arm portion 60 relative to the second portion 56. Similarly, the tab 104 of the arm portion 60 may be provided with a particular size and/or a particular shape to accomplish a given degree of retention of the tab 104 within the opening 88. In general, the hole 80, the opening 88, and/or the tab 104 may be designed to provide particular operating characteristics with regard to the movement of the arm portion 60 relative to the second portion 56.

Referring further to FIGS. 3-8, the rotation assembly 48 is designed to have the arm portion 60 transition from the engaged state to the disengaged state without action or input from the occupant of the seating assembly 20. For example, the arm portion 60 may be transitioned from the engaged state to the disengaged state by exertion of an external force on the seating assembly 20. In various examples, the external force that is exerted upon the seating assembly 20 to transition the arm portion 60 from the engaged state to the disengaged state can have a predetermined magnitude and/or a predetermined directionality. For example, the external force may be exerted upon the seating assembly 20 in a forward direction, as indicated by arrow 172 in FIG. 4. In such an example, exertion of the external force can result in the tab 104 exiting the hole 80 and/or the opening 88. In some examples, the engagement between the tab 104, the hole 80, and/or the opening 88 may provide little to no resistance to removal of the tab 104 from the hole 80 and/or the opening 88. Once the tab 104 has exited the hole 80 and/or the opening 88, the second portion 56 may be permitted to rotate relative to the first portion 52.

Referring still further to FIGS. 3-8, it is contemplated that the coupling of the arm portion 60 to the support member 156 may be accomplished such that the hinge member 160 provides a biasing force toward the disengaged state. In such an example, the engagement between the tab 104 and the hole 80 and/or the opening 88 may provide a degree of retention of the tab 104 that resists transitioning from the engaged state to the disengaged state. The biasing force that may be provided by the hinge member 160 can encourage the transition from the engaged state to the disengaged state upon application of the external force. Additionally, in such an example, the biasing force provided by the hinge member 160 may decrease the value of the predetermined magnitude required for transitioning the arm portion 60 from the engaged state to the disengaged state. In various examples, a thickness 176 of the tab 104 and/or a thickness 180 of the leg 76 may be chosen such that if the tab 104 were to fail to exit the hole 80 and/or the opening 88 then application of the external force may result in a shearing of the tab 104 and/or the leg 76, thereby resulting in a permitting of the second portion 56 to rotate relative to the first portion 52 even if the arm portion 60 does not transition from the engaged state to the disengaged state.

Referring again to FIGS. 3-8, the locking member 44 can hold the recliner member 40 in a given position when the locking member 44 is in a locked position (see FIG. 4). The locking member 44 can be actuated to an unlocked position (e.g., by actuation of a recliner arm, a motor, etc.). When the locking member 44 is in the unlocked position, the seatback 28 of the seating assembly 20 is capable of rotating relative to the seat 24 and/or the coupling member 32. In such a situation, an entirety of the rotation assembly 48 rotates with the seatback 28. When the locking member 44 is in the locked position, the seatback 28 is unable to rotate relative to the seat 24 and/or the coupling member 32. When the arm portion 60 is in the engaged state, the seatback 28 is not capable of rotating relative to the recliner member 40. Accordingly, when the locking member 44 is in the locked position relative to the recliner member 40 and the arm portion 60 is in the engaged state, the seatback 28 cannot be rotated relative to the seat 24 and/or the coupling member 32 beyond an amount of "play" that may be present between various components. The "play" present in the seating assembly 20 may be as a result of clearances provided between engaged components (e.g., clearances provided between the teeth 148 of the locking member 44 and the teeth 152 of the recliner member 40).

Referring yet again to FIGS. 3-8, when the external force is applied to the seating assembly 20 in the predetermined direction and at least at the predetermined magnitude, the locking member 44 can hold the recliner member 40 in the current position (e.g., by engagement between the teeth 148 of the locking member 44 and the teeth 152 of the recliner member 40). As the first portion 52 of the rotation assembly 48 is coupled to the recliner member 40, the locking member 44 may additionally retain the first portion 52 as stationary, or substantially stationary, during exertion of the external force. As stated above, in response to the application of the external force, the arm portion 60 is transitioned from the engaged state to the disengaged state. With the arm portion 60 in the disengaged state, the second portion 56 of the rotation assembly 48 is permitted to move (e.g., rotate) relative to the first portion 52 of the rotation assembly 48. With the second portion 56 free to move relative to the first portion 52, an applied force may be exerted upon the seatback 28 in a direction that opposes the exertion of the external force. In various examples, the applied force may be referred to as a reactionary force relative to the external force. The applied force may be provided by the occupant of the seating assembly 20.

Referring further to FIGS. 3-8, as the second portion 56 rotates relative to the first portion 52, a volume of the chamber 92 may decrease. For example, when the arm portion 60 is in the disengaged state, the second portion 56 may be driven to rotate in a clockwise direction as depicted in FIG. 4 due to the application of the applied force upon the seatback 28. The first portion 52 and the second portion 56 may engage with one another in a threaded fashion. For example, an outer surface 184 of the inner wall 64 and/or an inner surface 188 of the outer wall 68 may define threads 192 therein. A corresponding surface of the second portion 56 defines complementary threads 194 to engage with the threads 192 provided on the first portion 52. For example, when the threads 192 are provided on the outer surface 184 of the inner wall 64 of the first portion 52, the corresponding and complementary threads 194 provided on the second portion 56 may be defined by an interior surface 196 of the second portion 56. Alternatively, when the threads 192 are defined by the inner surface 188 of the outer wall 68 of the first portion 52, the corresponding and complementary threads 194 may be provided on, or defined by, the circumferential surface 108 of the second portion 56.

Referring still further to FIGS. 3-8, the threaded engagement between the first portion 52 and the second portion 56 can prevent the first portion 52 and the second portion 56 from becoming decoupled from one another when a force is applied to the rotation assembly 48 in an axial direction (e.g., a vertical direction as depicted in FIGS. 5 and 6). The threaded engagement between the first portion 52 and the second portion 56 also guides rotational motion of the second portion 56 relative to the first portion 52 when the arm portion 60 is in the disengaged state and the applied force induces the seatback 28 to rotate relative to the first portion 52. A first seal 198 can be coupled to the first portion 52. For example, the first seal 198 can be coupled to the outer surface 184 of the inner wall 64 such that the first seal 198 extends into the channel 84. The first seal 198 may be, but is not limited to, an O-ring. The first seal 198 may be made of any suitable material (e.g., rubber, silicone, etc.). As the second portion 56 rotates relative to the first portion 52, a lower surface 200 of the second portion 56 is moved closer to the floor 72 of the first portion 52. Said another way, a distance 204 between the lower surface 200 of the second portion 56 and the floor 72 of the first portion 52 decreases as the second portion 56 rotates in the clockwise direction relative to the first portion 52.

Referring again to FIGS. 3-8, a second seal 206 can be coupled to the second portion 56. For example, the second seal 206 can be coupled to the circumferential surface 108 of the second portion 56 such that the second seal 206 engages the inner surface 188 of the outer wall 184 of the first portion 52. The second seal 206 may be, but is not limited to, an O-ring. The second seal 206 may be made of any suitable material (e.g., rubber, silicone, etc.). In some examples, the first seal 198 may be alternatively coupled to the inner surface 188 of the outer wall 68 of the first portion 52 and the second seal may be alternatively coupled to the interior surface 196 of the second portion 56. In various examples, the first seal 198 and the second seal 206 each may be coupled directly to the first portion 52. For example, the first seal 198 may be arranged as depicted in FIG. 5 while the second seal 206 is coupled to the inner surface 188 of the outer wall 68 of the first portion 52. In alternative examples, the first seal 198 and the second seal 206 each may be coupled directly to the second portion 56. For example, the second seal 206 may be arranged as depicted in FIG. 6 (i.e., coupled to the circumferential surface 108) while the first seal 198 is coupled directly to the interior surface 196 of the second portion 56.

Referring further to FIGS. 3-8, the first seal 198 and the second seal 206 each may be received in a notch or a recess defined by the surface that receives the corresponding seal. It is contemplated that it may be beneficial to arrange the first seal 198 on the outer surface 184 of the inner wall 64 of the first portion 52 and arrange the second seal 206 on the circumferential surface 108 of the second portion 56. For example, the first seal 198 and the second seal 206 each may be configured to provide a degree of compression, or a compressive force, that aids in retaining the first seal 198 and the second seal 206 in a designed, or intended, position. Regardless of the particular arrangement of the first seal 198 and the second seal 206 in a given example, the first seal 198 and the second seal 206 each are positioned above the threads 192 and the threads 194 when the rotation assembly 48 is fully assembled. The first seal 198 and the second seal 206 aid in retaining a fluid composition 208 within an intended location, such as retaining the fluid composition 208 within the chamber 92, when the volume of the chamber 92 is decreased.

Referring now to FIGS. 9 and 10, the chamber 92 of the rotation assembly 48 may be filled with the fluid composition 208. In various examples, the fluid composition 208 can resist compression when the volume of the chamber 92 is decreased. For example, as the distance 204 between the lower surface 200 of the second portion 56 and the floor 72 of the first portion 52 decreases, the fluid composition 208 may decrease a rate, or a speed, of rotation of the second portion 56 relative to the first portion 52 by resisting compression. In some examples, the fluid composition 208 can include a liquid and particles. For example, the fluid composition 208 can include a fluid portion 212 and a particle portion 216 that includes nanoparticles 220. In one specific example the fluid composition 208 can be a liquid nanofoam. Regardless of the specific composition of the fluid composition 208, the presence of the fluid composition 208 within the chamber 92 can slow a rate, or a speed, of rotation of the seatback 28 relative to the seat 24, the coupling member 32, and/or the recliner member 40.

Referring again to FIGS. 9 and 10, the particle portion 216 may have any geometric cross-section, such as a circular cross-section, a rectangular cross-section, or a triangular cross-section, without departing from the concepts disclosed herein. The fluid of the fluid portion 212 may be a liquid. In embodiments that employ liquid nanofoam within the rotation assembly 48, the nanoparticles 220 of the particle portion 216 may have a diameter that is in the range of about 0.1 nm to about 1,000 nm, about 1 nm to about 100 nm, about 10 nm to about 100 nm, or combination thereof. Additionally, the nanoparticles 220 may have various diameters within the particle portion 216. Alternatively, the nanoparticles 220 may have uniform diameters within the particle portion 216. In some embodiments, prior to the exertion of the external force and disengagement of the arm portion 60 from the leg 76, the fluid portion 212 can be co-localized with the particle portion 216 but generally excluded from the nanoparticles 220. Said another way, the nanoparticles 220 may be generally free of the fluid of the fluid portion 212 when the rotation assembly 48 is in an extended position (FIG. 9). In one embodiment, when the rotation assembly 48 transitions from the extended position to a compressed position (i.e., the distance 204 decreases—as in FIG. 10), the fluid of the fluid portion 212 is at least partially transitioned from being co-localized with the particle portion 216 to being co-localized within the nanoparticles 220. Said another way, as the fluid composition 208 is compressed, the fluid from the fluid portion 212 is at least partially forced out of the particle portion 216 and into the nanoparticles 220. In so doing, the second portion 56 is able to travel vertically downward in the first portion 52 and compress the fluid composition 208.

Referring further to FIGS. 9 and 10, in various examples, the particle portion 216 may be provided with a coating (e.g., on an interior of the particles of the particle portion 216) that repels the fluid portion 212. For example, the coating may be hydrophobic when the fluid portion 212 is water-based. Alternatively, the coating may be hydrophilic when the fluid portion 212 is oil-based. In one specific example, the particles 216 of the particle portion 216 can define pores therein. These pores may be coated with a material that repels the fluid portion 212. Accordingly, when the arm portion 60 is in the engaged state and the second portion 56 has not rotated relative to the first portion 52, the particles of the particle portion 216 may be hollow spheres. In such an example, when the arm portion 60 has transitioned to the disengaged state and/or the second portion 56 has rotated relative to the first portion 52, the compressive force provided to the fluid composition 208 by decreasing the volume of the chamber 92 can overcome the force of repulsion provided by the coating such that the hollow spheres of the particle portion 216 receive some of the fluid portion 212. The result of such a change is an effective, or apparent, decrease in volume of the fluid portion 212, thereby providing a degree of compliance or give to the seatback 28 of the seating assembly 20. Relocation of at least a portion of the fluid portion 212 into voids defined by the particle portion 216 (e.g., the hollow spheres) can provide the effective decrease in volume of the fluid composition 208. Upon relieving the compressive force provided by rotation of the second portion 56 relative to the first portion 52, the fluid portion 212 may exit the voids defined by the particle portion 216. In various examples, the fluid portion 212 may be a Newtonian fluid.

Referring again to FIGS. 9 and 10, in one specific example, the particles of the particle portion 216 may be made of silicon. The fluid composition 208 can be arranged to provide a certain degree of compliance under a predetermined force or predetermined range of forces. For example, and without limitation, a diameter of the pores on the particles of the particle portion 216, a number of pores on the particles of the particle portion 216, a size of the particles of the particle portion 216, a number of particles within the fluid composition 208, a material of the coating provided on the particles of the particle portion 216, a material of the particles of the particle portion 216, a viscosity of the fluid portion 212, and/or a composition of the fluid portion 212 may be chosen to provide a desired degree of resistance to compression. In one specific example, the fluid composition 208 may be arranged to provide resistance to compression forces in a range of about 500 Newtons to about 8,000 Newtons. In some examples, the rotation assembly 48 may provide up to about one inch of rotational compliance to the seatback 28. Said another way, in some examples, the rotation assembly 48 may enable the seatback 28 to rotate up to about one inch relative to the recliner member 40.

Referring still further to FIGS. 9 and 10, in some examples, the particle portion 216 and/or the fluid portion 212 of the rotation assembly 48 may include a non-Newtonian fluid (e.g., a dilatant fluid). Non-Newtonian fluids exhibit a non-linear relationship between rates of shear strain and shear stress. The particle portion 216 and/or the fluid portion 212 of the rotation assembly 48 may provide the resistance to compression through shear thickening that is provided by the non-Newtonian fluid. Shear thickening occurs in non-Newtonian fluids when the viscosity of a fluid increases with the rate of shear strain. Accordingly, the non-Newtonian fluid may act more solid-like in response to rapid external forces, for example, when shear strain is high (e.g., rapid rotation of the second portion 56 relative to the first portion 52). In contrast, when shear strain is low the non-Newtonian fluid may act more liquid-like and flow more freely (e.g., gradual rotation of the second portion 56 relative to the first portion 52).

The seating assembly 20 disclosed herein is provided with the rotation assembly 48. The rotation assembly 48 can be reusable after having experienced the external force, the arm portion 60 being transitioned to the disengaged state, and the chamber 92 decreasing in volume. Said another way, the rotation assembly 48 may be reused by adjusting the position of the second portion 56 relative to the first portion 52, if needed, to align the rotation assembly 48 such that the tab 104 is capable of being received within the hole 80 defined by the leg 76 and/or within the opening 88 defined by the second portion 56. Upon re-insertion of the tab 104 into the hole 80 and/or the opening 88, the arm portion 60 can resume the engaged state and the rotation assembly 48 may be prepared for exposure to a future exertion of the external force. Alternatively, the rotation assembly 48 may be replaced after exposure to a predetermined number of the external forces.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly, comprising:
   a rotation assembly, wherein the rotation assembly comprises:
      a first portion having an inner wall, an outer wall, and a floor extending between the inner wall and the outer wall, wherein the outer wall comprises a leg that extends away from the floor of the first portion, wherein the leg defines a hole, and wherein the inner wall, the outer wall, and the floor define a channel;
      a second portion that is received within the channel of the first portion to define a chamber within the channel and between the second portion and the floor, wherein the second portion is movable relative to the first portion; and
      an arm portion having a first end, a second end, and a tab, wherein the first end is rotatably coupled to a circumferential surface of the second portion, wherein the tab is positioned proximate to the second end, wherein the arm portion is movable between an engaged state and a disengaged state relative to the hole defined by the leg of the first portion, and wherein the tab is received within the hole defined by the leg when the arm portion is in the engaged state;
   wherein the seating assembly further comprises:
      a seat; and
      a seatback, wherein the seatback is pivotable relative to the seat.

2. The seating assembly of claim 1, wherein, when the arm portion is in the engaged state, movement of the second portion of the rotation assembly relative to the first portion of the rotation assembly is prevented.

3. The seating assembly of claim 1, wherein, when the arm portion is in the disengaged state, rotation of the seatback away from the seat decreases a volume of the chamber defined by the first portion and the second portion.

4. The seating assembly of claim 3, wherein the chamber is filled with a fluid composition.

5. The seating assembly of claim 4, wherein the fluid composition resists compression when the volume of the chamber is decreased.

6. The seating assembly of claim 5, wherein the fluid composition comprises a liquid and particles.

7. The seating assembly of claim 6, wherein the fluid composition is a liquid nanofoam.

8. The seating assembly of claim 1, further comprising:
   a coupling member that couples the seatback to the seat, wherein the seatback is pivotable relative to the coupling member, and wherein the coupling member defines a space.

9. The seating assembly of claim 8, further comprising:
   a recliner member that is received in the space defined by the coupling member, wherein the recliner member is rotatable relative to the seat and the coupling member.

10. The seating assembly of claim 9, further comprising:
    a locking member that is configured for selective engagement with the recliner member, wherein engagement between the locking member and the recliner member retains the recliner member in a position relative to the coupling member.

11. The seating assembly of claim 9, wherein the first portion of the rotation assembly is fixedly coupled to the recliner member.

12. The seating assembly of claim 11, wherein the second portion of the rotation assembly is fixedly coupled to the seatback.

13. The seating assembly of claim 12, wherein the arm portion is transitioned from the engaged state to the disengaged state by exertion of an external force on the seating assembly, wherein the external force is of a predetermined magnitude and a predetermined direction.

14. The seating assembly of claim 1, wherein the second portion defines an aperture that extends therethrough such that the second portion has an inner diameter and an outer diameter.

15. A seating assembly, comprising:
    a seat;
    a seatback, wherein the seatback is pivotable relative to the seat;
    a coupling member that couples the seatback to the seat, wherein the seatback is pivotable relative to the coupling member, and wherein the coupling member defines a space;

a recliner member that is received in the space defined by the coupling member, wherein the recliner member is rotatable relative to the seat and the coupling member;

a locking member that is configured for selective engagement with the recliner member, wherein engagement between the locking member and the recliner member retains the recliner member in a position relative to the coupling member;

a rotation assembly, wherein the rotation assembly comprises:
- a first portion having an inner wall, an outer wall, and a floor extending between the inner wall and the outer wall, wherein the outer wall comprises a leg that extends away from the floor of the first portion, wherein the leg defines a hole, and wherein the inner wall, the outer wall, and the floor define a channel;
- a second portion that defines an opening, wherein the second portion is received within the channel of the first portion to define a chamber between the second portion and the channel, and wherein the second portion is movable relative to the first portion; and
- an arm portion having a first end, a second end, and a tab, wherein the first end is rotatably coupled to a circumferential surface of the second portion, wherein the tab is positioned proximate to the second end, wherein the arm portion is movable between an engaged state and a disengaged state relative to the hole defined by the leg of the first portion and the opening defined by the second portion, wherein the hole defined by the leg and the opening defined by the second portion align when the arm portion is in the engaged state, wherein, when the arm portion is in the engaged state, movement of the second portion relative to the first portion is prevented, wherein, when the arm portion is in the disengaged state, rotation of the seatback away from the seat decreases a volume of the chamber defined by the first portion and the second portion, and wherein the tab is received within the hole defined by the leg and the opening defined by the second portion when the arm portion is in the engaged state.

16. The seating assembly of claim 15, wherein the first portion of the rotation assembly is fixedly coupled to the recliner member, and wherein the second portion of the rotation assembly is fixedly coupled to the seatback.

17. The seating assembly of claim 15, wherein the arm portion is transitioned from the engaged state to the disengaged state by exertion of an external force on the seating assembly, wherein the external force is of a predetermined magnitude and a predetermined direction.

18. The seating assembly of claim 15, wherein the second portion defines an aperture that extends therethrough such that the second portion has an inner diameter and an outer diameter.

19. The seating assembly of claim 15, wherein the chamber is filled with a fluid composition, wherein the fluid composition resists compression when the volume of the chamber is decreased, and wherein the fluid composition is a liquid nanofoam.

* * * * *